(12) United States Patent
Andrew et al.

(10) Patent No.: US 7,698,364 B2
(45) Date of Patent: Apr. 13, 2010

(54) SHARED VIEWS FOR BROWSING CONTENT

(75) Inventors: Felix G. T. I. Andrew, Seattle, WA (US);
David A. Sobeski, Redmond, WA (US);
Michael D. Smith, Kirkland, WA (US);
Lisa G. Post, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1383 days.

(21) Appl. No.: 10/068,816

(22) Filed: Feb. 5, 2002

(65) Prior Publication Data
US 2002/0073152 A1    Jun. 13, 2002

Related U.S. Application Data

(62) Division of application No. 09/316,822, filed on May 21, 1999, now abandoned.

(51) Int. Cl.
*G06F 15/16* (2006.01)
*G06F 3/00* (2006.01)
*G06F 3/048* (2006.01)

(52) U.S. Cl. .................. 709/204; 709/208; 715/751; 715/753; 715/759

(58) Field of Classification Search ......... 709/204–207, 709/217, 219, 208; 715/733–759
See application file for complete search history.

(56) References Cited

U.S. PATENT DOCUMENTS 5,774,670 A * 6/1998 Montulli .................. 709/227

5,861,883 A * 1/1999 Cuomo et al. ............... 715/733

(Continued)

FOREIGN PATENT DOCUMENTS

EP        0 820 028 A2    1/1998

(Continued)

OTHER PUBLICATIONS

Veen, J., "The Big Push for Passive Viewing", Sep. 9, 1996, http://www.webmonkey.com/webmonkey/tools/96/37/index0a.html, 3 pages.

*Primary Examiner*—Aaron Strange
(74) *Attorney, Agent, or Firm*—Woodcock Washburn LLP

(57) ABSTRACT

Systems and methods for enabling users at a plurality of client computers to share a common browsing experience are provided. A server computer according to the invention includes an interface to a communications network for establishing a first link between the server and the host client computer and a second link between the server and the slave client computer. The server has a shared view engine for receiving from the host client computer, an identifier that identifies the slave client computer and a locator corresponding to content on the server. The shared view engine causes the server to deliver the content corresponding to the locator to both the host client computer and the slave client computer. Thus, the host client computer and the slave client computer are enabled to share browsing of the content received from the server. To enable the slave clients to share in the browsing experience, the host client can send information such as URL and cookie data to the slave clients. Using the information from the host client, the slave clients can request the same Web pages being viewed by the host client. Alternatively, the host client can request the content not only for itself, but for the slave clients as well.

16 Claims, 4 Drawing Sheets

U.S. PATENT DOCUMENTS

| | | | | |
|---|---|---|---|---|
| 5,862,330 A | * | 1/1999 | Anupam et al. | 709/204 |
| 5,918,009 A | | 6/1999 | Gehani et al. | 395/187.01 |
| 5,944,791 A | | 8/1999 | Scherpbier | 709/218 |
| 5,956,027 A | | 9/1999 | Krishnamurthy | 345/329 |
| 5,987,504 A | * | 11/1999 | Toga | 709/206 |
| 5,991,796 A | * | 11/1999 | Anupam et al. | 709/206 |
| 6,021,491 A | * | 2/2000 | Renaud | 713/179 |
| 6,115,040 A | * | 9/2000 | Bladow et al. | 715/741 |
| 6,144,991 A | * | 11/2000 | England | 709/205 |
| 6,181,689 B1 | * | 1/2001 | Choung et al. | 370/352 |
| 6,230,171 B1 | * | 5/2001 | Pacifici et al. | 715/512 |
| 6,233,600 B1 | | 5/2001 | Salas et al. | 709/201 |
| 6,240,443 B1 | | 5/2001 | Suzuki et al. | 709/204 |
| 6,240,444 B1 | * | 5/2001 | Fin et al. | 709/205 |
| 6,295,550 B1 | * | 9/2001 | Choung et al. | 709/204 |
| 6,473,798 B1 | * | 10/2002 | Grosser et al. | 709/224 |
| 6,672,775 B1 | * | 1/2004 | Narayanaswami | 709/219 |
| 6,687,739 B2 | * | 2/2004 | Anupam et al. | 709/204 |
| 6,732,145 B1 | * | 5/2004 | Aravamudan et al. | 709/204 |

FOREIGN PATENT DOCUMENTS

| | | |
|---|---|---|
| EP | 0 833 260 A2 | 4/1998 |
| EP | 0 838 770 A2 | 4/1998 |
| WO | WO 98/49635 | 11/1998 |

* cited by examiner

SHARED VIEWS FOR BROWSING CONTENT

CROSS-REFERENCE TO RELATED APPLICATIONS

This application is a division of U.S. patent application Ser. No. 09/316,822, filed May 21, 1999 now abandoned, the contents of which are hereby incorporated herein in their entirety.

TECHNICAL FIELD

The present invention relates generally to the field of client-server computing, and more particularly to methods and systems for allowing multiple clients to share a common browsing experience.

BACKGROUND OF THE INVENTION

The Internet is a worldwide computer network via which computer systems communicate using the well-defined Internet Protocol (IP). Computers that are connected directly to the Internet each have a unique Internet address. Typically, each computer is assigned a unique IP address so that no two machines have the same IP address. To simplify Internet addressing, the Domain Name System (DNS) allows users to access Internet resources with a simpler alphanumeric naming system. An Internet Domain name includes a series of alphanumeric names separated by periods. To further define the addresses of resources on the Internet, the Universal resource Locator system was created. A Universal resource Locator (URL) is a descriptor that specifically defines a type of Internet resource and its location. Resources on the Internet are uniquely addressable by their URL.

Typically, a user navigates the Internet using a browser residing on the user's computer. The browser is an operating system component or application program that allows the user to retrieve documents from the World Wide Web (or simply "the Web") using simple point-and-click commands. Typical browsers allow for multimedia presentation of stored data including text images, sound clips, and video clips. This allows the user to connect to different Web sites on the Internet.

The Web is a collection of files or "Web pages" that include text, graphics, and other forms of content. Typically, a Web page is connected by hyper-links to other Web pages. Using a mouse to click on a hyper-link initiates a process that locates and retrieves the linked Web page, regardless of the physical location of that page.

The Web uses the client-server model to communicate information between client computers and server computers. The terms "client" and "server" are used to refer to a computer's general role as a requester of data (the client) or provider of data (the server). In the Web environment, browsers reside in clients and Web pages reside in servers. Clients and servers communicate with one another using the Hypertext Transfer Protocol (HTTP). A browser opens a connection to a server and initiates a request for a Web page. The server delivers the requested Web page, typically in the form of a text document coded in a standard Hypertext Markup Language (HTML) format.

To access an initial Web page, the user enters the URL for a Web document into the browser, or selects the UTRL from a list of "favorites" (which is typically stored on the client's hard drive). The browser then sends an HTTP request to the server that has the Web document corresponding to the URL, and the Web server responds to the HTTP request by sending the requested HTTP object to the client.

One application, known as a "customizable home page," permits users, upon the request of a server, to make certain choices. When a user who has done so contacts that server at a later date, the server assembles information for downloading to the user in accordance with the previously selected choices. The server delivers a Web page with a response header which creates an ID field located in a file on the client computer (this file is known as the "client ID" or "cookie" file) to include information about the user's preferences. When the user later returns to a specified URL, on the same server, the cookie with the previously-set preference information is transmitted in the HTTP request header to the server, which can then return a Web page that is assembled according to the user-specific information.

There are certain situations in which it would be advantageous for multiple users to navigate the Web together. That is, the several users would benefit from being able to view the same Web pages at the same time automatically. For example, two users located at different computers in different parts of the world might want to search for certain content on the Web. Each of the users would benefit from being able to share the other's browsing experience, such that, when either user navigates to a Web site, the other would follow along automatically.

SUMMARY OF THE INVENTION

The present invention provides a mechanism for multiple network-based clients to share a common browsing experience. According to the present invention, a number of client computers are connected to one or more server computers via a communications network such as a local area network (LAN), wide area network (WAN), intranet, or the Internet. A user on a first, or host, client begins "browsing" the network, i.e., requesting that the servers deliver certain content to the host client. If the user at the host client so desires, he can grant permission to one or more of the other, or slave, clients to share in the browsing experience.

A server computer according to the invention includes an interface to a communications network for establishing a first link between the server and the host client computer and a second link between the server and the slave client computer. The server has a shared view engine for receiving from the host client computer, an identifier that identifies the slave client computer and a locator corresponding to content on the server. The shared view engine causes the server to deliver the content corresponding to the locator to both the host client computer and the slave client computer. Thus, the host client computer and the slave client computer are enabled to share browsing of the content received from the server.

In one implementation of the invention, to enable the slave clients to share in the browsing experience, the host client sends information such as URL and cookie data to the slave clients. Using the information from the host client, the slave clients can request the same Web pages being viewed by the host client. Alternatively, the host client requests the content not only for itself, but for the slave clients as well.

For security reasons, it is preferable for permission to be granted unilaterally, i.e., for the host client to grant permission to the slave clients to browse along with the host. That is, the slave clients cannot share the host's browsing experience without the host's permission.

In an exemplary implementation of the invention, the clients communicate with each other via PPTP (Point to Point Tunneling Protocol), although any appropriate point-to-point communications protocol could be used. For example, when the host client requests a Web page from a Web server, it sends the URL for that page and any needed cookie data to the slave clients via a communications link that supports a point-to-point protocol. The slave clients can then request the same Web page from that server. In this way, the users of different clients enjoy a shared browsing experience while incurring the small overhead required to transmit the URL and any needed cookie data between the clients. Once the users are all browsing together, each user will be able to view the current page independently of every other user. If any user requests a different Web page, however, all the clients will request (or be sent) the same Web page. In this way, all the clients continue to share the same browsing experience.

These and other features of the present invention are described in greater detail below.

BRIEF DESCRIPTION OF THE DRAWINGS

The foregoing summary and the following detailed description of presently preferred embodiments are better understood when read in conjunction with the appended drawings, in which.

DETAILED DESCRIPTION OF PREFERRED EMBODIMENTS

Overview

The methods and systems of the present invention provide a mechanism for multiple users to share a common browsing experience in an environment where a plurality of client computers are networked to one or more server computers via a communications network such as the Internet (although the invention is by no means limited to uses on the Internet). Basically, a shared view engine according to the present invention enables a user at a host client to grant permission to other ("slave") clients to share the same browsing experience by causing the servers to download to all of the clients Web pages requested by any one of them.

In one embodiment, a shared view engine is run on each of the plurality of clients. The shared view engines interface with the browsers resident on the clients. The shared view engine on the host client is launched when the user at the host client instructs the browser to connect to the network. If the user at the host client wishes to permit the users at the slave clients to share in the browsing experience, the user at the host client can grant permission to the slave clients to do so.

More specifically, the shared view engine at the host client establishes a point to point connection with the shared view engines at the slave clients. From that point onward, whenever the host client requests a Web page from a server, the shared view engine at the host client sends a message to each of the slave clients that includes the URL for the requested Web page. The shared view engines on the slave clients request, via their respective browsers, the same Web page by sending the URL to that server. If cookie data is required to access a Web site, the host client sends the cookie data along with the UTRL.

Similarly, if any of the slave clients requests a Web page, the requesting slave client sends the URL and cookie data to the host client, which in turn sends the URL and cookie data to any other slave clients. The host client and the other slave clients all request the same Web page. In this way, the host client and the slave clients are always "on the same page."

Alternatively, the host client can instruct a server to deliver the requested content to all the clients if any one client requests a Web page. Thereafter, if any client (host or slave) requests a Web page, the server delivers the content to all the clients. Once again, this ensures that all the clients are on the same page at all times.

The present invention will now be explained in greater detail with reference to a presently preferred embodiment thereof. First, a description of exemplary computer and network environments is provided, and then a detailed description of the inventive methods and systems for enabling a plurality of client computers to share views for browsing content is provided.

Computer Environment

Figure 1:
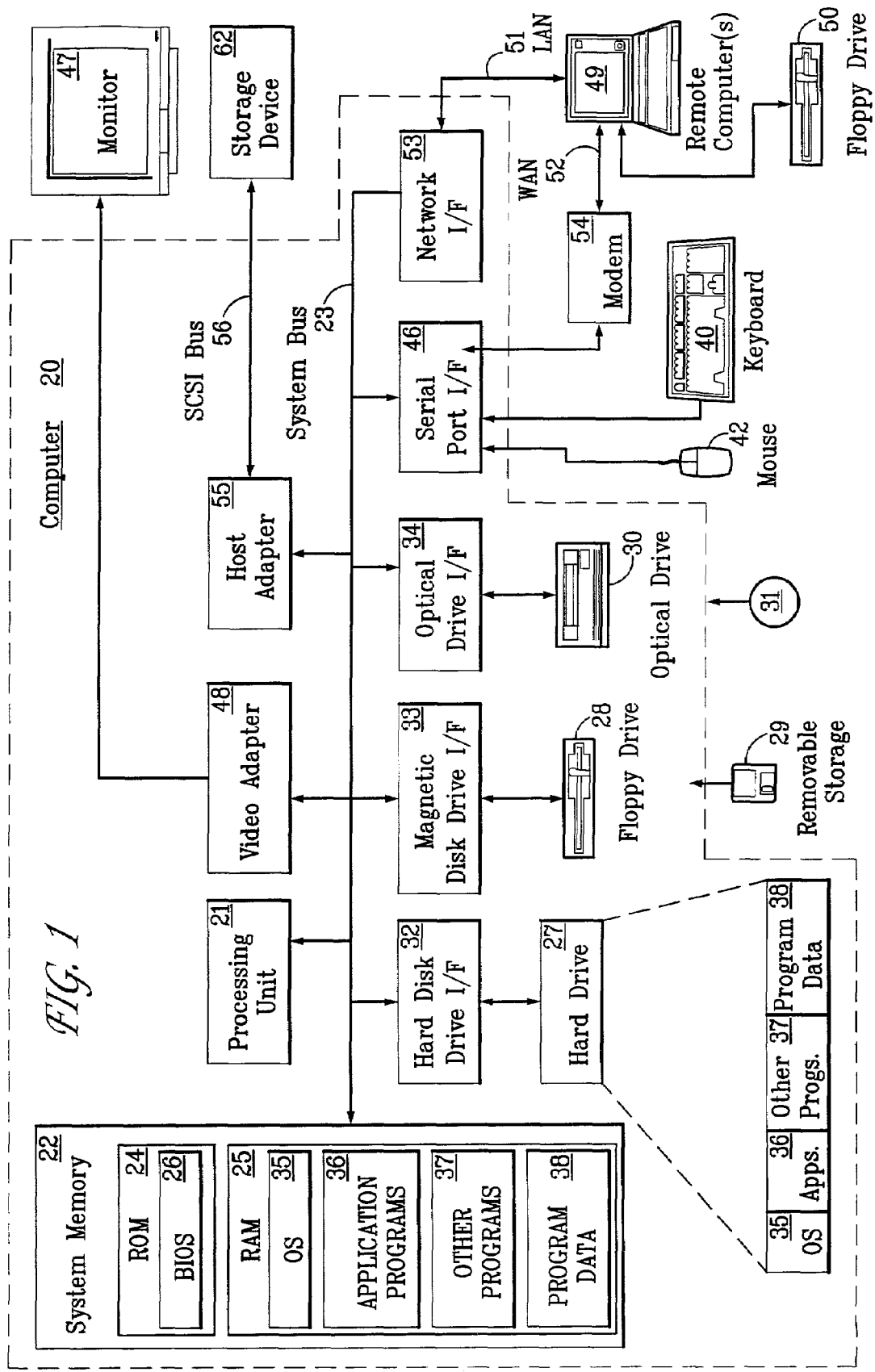
FIG. 1 is a block diagram representing a general purpose computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 2:
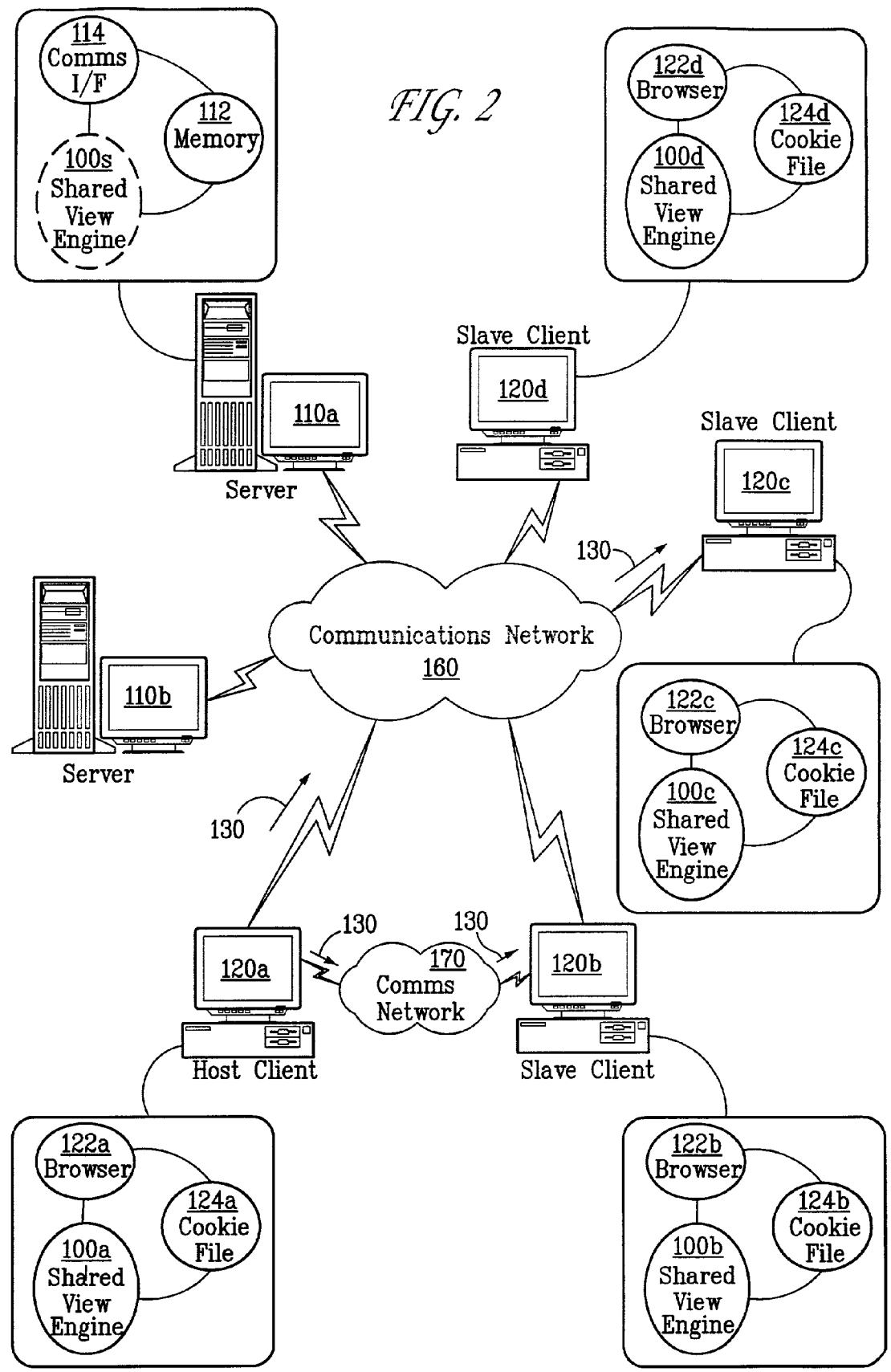
FIG. 2 is a schematic diagram of a system for enabling multiple users to share a common browsing experience in accordance with the present invention.

As noted, the computer described above can be deployed as part of a computer network. In general, the above description applies to both server computers and client computers deployed in a network environment. FIG. 2 illustrates one such exemplary network environment in which the present invention may be employed.

As shown in FIG. 2, a number of server computers 110 are interconnected with a number of client computers 120 via a communications network 160 (which can be a LAN, WAN, intranet, or the Internet). In a network environment in which the communications network 160 is the Internet, for example, the servers 110 can be Web servers with which the clients 120 communicate via any of a number of known protocols, such as HTTP.

A client computer 120 interfaces with the communications network 160 via a browser 122. The browser 122 enables the user at the client 120 to access certain sites on the servers 110. Where network 160 is the Internet, the servers 110 are Web servers and the sites are known as "Web sites." Currently, a number of browsers 122 are commercially available for personal computers and other types of client computers 120 (such as hand-held computers, palm-sized computers, or any other type of computer that can be used for browsing).

Each client computer 120 also has a cookie file 124. The cookie files 124 include information the respective clients 120 need to access certain sites on the servers 110. In particular, some Web sites require the client to provide a username and password, for example, before the corresponding server 110 will download content from the Web site onto the client 120. Typically, these usernames and passwords, along with other access information, such as registration numbers, etc., are included in the client's cookie file 124. When the user enters a URL for a Web site that requires cookie data, the server 110 requests the cookie data from the client 120. In response, the browser 122 gathers the required cookie data from the cookie file 124 and provides the cookie data to the server 110. Assuming the cookie data is correct, the server 110 then delivers the content from the Web site to the client 120.

Methods and Systems for Enabling Multiple Clients to Share a Browsing Experience In a preferred embodiment of the present invention, each client computer 120 also includes a shared view engine 100 that enables multiple clients 120 to enjoy the same user experience. For explanatory purposes, client computer 120a will be referred to as the "host client," while the remaining clients 120b-d will be referred to as the "slave clients," although this designation is arbitrary. That is, in general, any of the clients 120 can be the host client for a shared browsing experience, although, in this implementation, there is only one host at a time during any particular shared experience.

If the user at the host client 120a wishes to share the browsing experience with the users at one or more of the slave clients 120b-c, the user at the host client 120a can cause the host client 120a to grant permission to any or all of the slave clients 120b-d to view the same content at the same time. For security reasons, it is preferred that the slave clients 120b-d be unable to share in the host client's browsing experience without permission from the host client 120a to do so.

To share the browsing experience, the user at the host client 120a executes the shared view engine 100a residing on the host client 120a. The user identifies to the shared view engine 100a those slave clients that the user wishes to grant permission to share the browsing experience. The user can share with any number of slave clients by identifying them to the shared view engine. For purposes of discussion, suppose that the user identifies slave clients 120b and 120c, but not 120d.

The shared view engine 100a establishes a communications link 130 between the host client 120a and the identified slave clients 120b, 120c. In a preferred embodiment, the communications link 130 supports a communications protocol such as point-to-point tunneling protocol (PPTP). PPTP is a protocol that encapsulates point-to-point protocol frames in IP datagrams for transmission over an IP internetwork, such as the Internet. PPTP can also be used in private LAN-to-LAN networking. Layer 2 Tunneling Protocol (L2TP) can also be used. L2TP is a network protocol that encapsulates point-to-point protocol frames to be sent over IP, X.25, Frame Relay, or Asynchronous Transfer Mode (ATM) networks. When configured to use IP as its datagram transport, L2TP can be used as a tunneling protocol over the Internet. L2TP can also be used directly over various WAN media (such as Frame Relay) without an IP transport layer. Although the above-described tunneling protocols are preferred, any protocol on which the clients agree can be used. It is contemplated that, in an Intranet or other "nonfirewall" setting, TCP/IP can be used. Thus, the communications link 130 can be established over the communications network 160 (the Internet in this example), or over a second communications network 170, which can be a LAN, for example, or by a direct connection between the clients 120, etc.

When the user at the host client 120a requests a Web site from one of the servers 110a, 110b, the shared view engine 100a on the host client 120a obtains, or intercepts, the URL for the requested Web site from the browser 122a. The shared view engine 100a sends the URL via the communications links 130 to the shared view engines 100b, 100c on the identified slave clients 120b, 120c. The shared view engines 100b, 100c pass the UTRL onto their respective browsers 122b, 122c, which request the same Web page from the server 110. In response, the server 100 downloads the content of the Web page onto the slave clients 120b, 120c. At this point, the host client 120a and the slave clients 120b, 120c are all viewing the same content, i.e., sharing the same browsing experience. (Although the individual clients may view the Web pages differently, i.e., the color, font, scroll position, etc., may be different for the respective clients.)

In some applications, the host client 120a can only view certain Web sites if it has certain required cookie data. Cookie data for the host client 120a is included in its cookie file 124a. Presumably, the slave clients 120b, 120c do not have the required cookie data in their cookie files 124b, 124c (although, by coincidence, they might). In this case, the shared view engine 100a will send not only the URL for the Web site, but also any required cookie data to the shared view engines 100b, 100c on the slave clients 120b, 120c. Shared view engines 100b, 100c will then update cookie files 124b, 124c, respectively, to include the additional cookie data. In this way, the slave clients 120b, 120c will have all the required permissions, etc., to access whatever Web site(s) the host client 120a is viewing.

In a preferred embodiment, once the host client 120a and the slave clients 120b, 120c are all viewing the same Web page, any of the clients 120 can "jump" to another Web site without permission from the host client 120a. Suppose the user at slave client 120b wishes to view a different Web page and provides a new address to browser 122b. The server 110 on which the Web page resides responds by downloading the content for the newly requested Web site onto the client 120b. Concurrently, the shared view engine 100b sends the URL and any required cookie data for the newly requested Web site to the host client 120a. The host client 120a then sends the URL and cookie data to the other slave clients, i.e., slave client 120c in the present example. The shared view engines 100a, 100c on the other clients 120a, 120c then cause their browsers 122a, 122c to request the new Web site from that server 110. The server 110 responds by downloading the content for the newly requested Web site onto the clients 120a, 120c.

In an alternative embodiment, the slave client 120b that requested the new Web site can send the UTRL and cookie data for the new Web site to all the other clients 120a, 120b. In this embodiment, however, every client 120 would have to establish a communications link 130 to every other client 120.

In still another embodiment of the present invention, the shared view engine 100a on the host client 120a could be made to control the entire experience. That is, the shared view engines 100b, 100c on the slave clients 120b, 120c could prevent the slave clients 120b, 120c from requesting any Web site during a shared browsing experience unless directed to do so by the host client 120a.

The user of any of the clients 120 can terminate the shared browsing experience for that client 120 by disconnecting from the communications network 160, or by terminating the shared view engine 100. When the user at client 120c, for example, decides to disconnect from the network 160, the shared view engine 100c terminates the communications link 130 to the host client 120a. The shared view engine 100c also ensures that the slave client's cookie file 124c is restored to its original state so that slave client 120c does not retain the access information provided to it by any of the other clients 120a, 120c. For this reason, the shared view engine 100 must maintain a copy of the original cookie file for restoration at the end of the shared viewing session.

Preferably, the user at slave client 120c can disconnect from the shared viewing experience without having to disconnect from the communications network 160. In such an embodiment, the user at slave client 120c interfaces directly with the shared viewing engine 100c to terminate the shared viewing engine 100c rather than the browser 122c. In this case, the shared viewing engine 100c terminates the communications link 130 to the host client 120a and restores the slave client's original cookie file 124c.

In another exemplary embodiment, a server-based shared view engine 100s is installed onto one or more of the servers, say server 110a as shown in FIG. 2. In this embodiment, the user at the host client 120a connects to server 110a via the communications network 160. The user at the host client 120a can then grant permission to one or more of the slave clients 120b-d to share the host client's browsing experience. To accomplish this, the shared view engine 100a on the host client 120a sends a message to server 110a that includes an identifier for each of the identified slave clients 120b-c. Preferably, the identifier is the IP address of the identified slave client. The server stores the identifiers in memory 112 in a file in which the identifiers are associated with an identifier that identifies the host client 120a. From that point onward, whenever one of the clients 120a-c requests a Web page from server 110a, server 110a draws on the identifiers stored in the file to enable server 110a to download the same content to all the clients 120a-c. Server 110a interfaces with the communications network 160 via a communications interface 114.

If the client 120 requesting the Web site (the "requesting client") needs cookie data to access the requested Web site, the requesting client sends the necessary cookie data to server 110a along with the URL. In this case, there is no need for the shared view engine 100 at the requesting client to send the cookie data or the URL for the Web site to the other clients. As long as the requesting client has the necessary cookie data, the shared view engine 100s at server 110a causes the server to download the same Web page to all the clients 120a-c. In this way, the requesting client tacitly grants permission for the other clients to view the Web page without actually altering the other clients' cookie files. Consequently, there is no need for the shared view engines 100a-c to keep track of the cookie files 124a-c residing on clients 120a-c, nor is there any need for the shared view engines 100a-c to restore the original cookie files when the session is terminated.

When one of the clients 120a-c decides to terminate the session, the shared view engine 100s at server 110a recognizes that the client has disconnected from the communications network 160 or otherwise requested that it be released from the shared session. Consequently, the shared view engine 100s no longer causes server 110a send the shared content to the disconnected client. If the host client 120a disconnects or otherwise terminates its shared session, the shared view engine 100s will terminate the shared viewing session for all the clients because the host client 120a is the only client that can grant permission for shared viewing.

Figure 3:
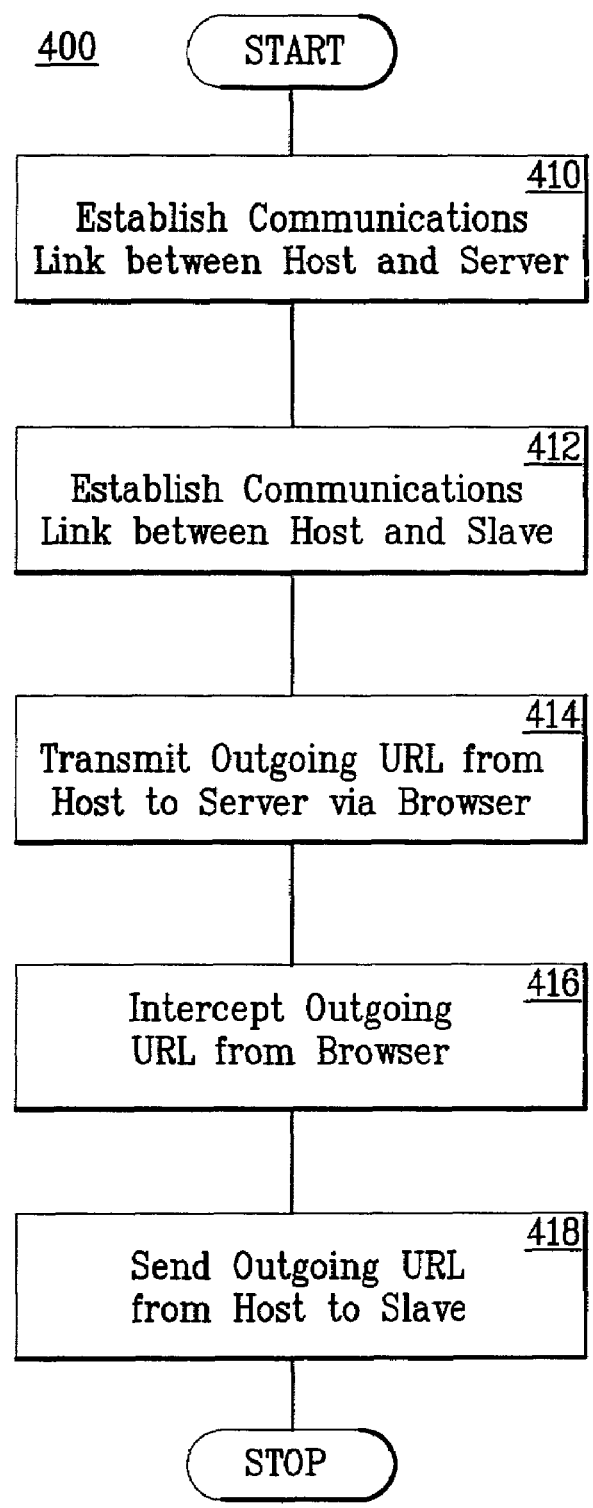
FIG. 3 is a flowchart of a method for operating a host client computer that enables multiple users to share a common browsing experience in accordance with the present invention.

FIG. 3 is a flowchart of a method 400 for operating a host client computer that enables multiple users to share a common browsing experience in accordance with the present invention. At step 410, the user at the host client computer establishes a first communications link (such as via the Internet) between the host client computer and a first Web server. At step 412, via a shared view engine running on the host client computer, the user establishes a second communications link (such as via PPTP) to one or more remote slave client computers.

At step 414, the user at the host client computer requests a Web page from the first Web server or from another Web server by transmitting an outgoing URL that corresponds to the selected Web page. The host client computer transmits the URL to the appropriate server via a browser running on the host client computer.

At step 416, the shared view engine running on the host client computer intercepts the outgoing URL from the browser. At step 418, the shared view engine on the host client computer sends the outgoing URL, along with any required cookie data, via the second communications link to shared view engines running on the remote slave client computers.

Figure 4:
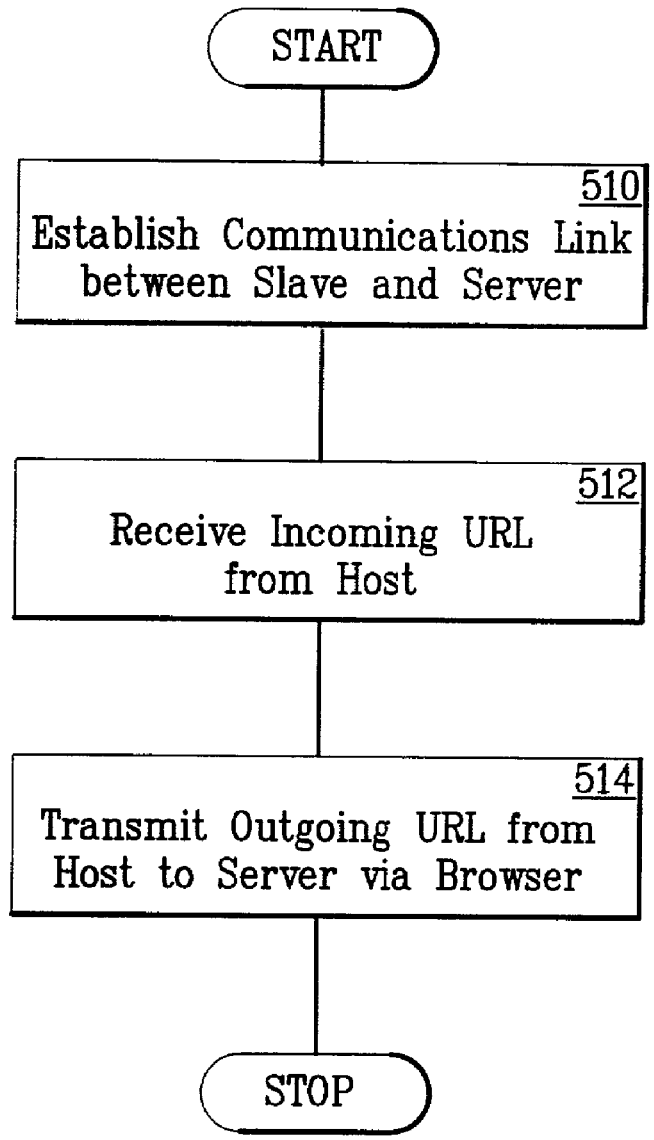
FIG. 4 is a flowchart of a method for operating a slave client computer that enables multiple users to share a common browsing experience in accordance with the present invention.

FIG. 4 is a flowchart of a method 500 for operating a slave client computer that enables multiple users to share a common browsing experience in accordance with the present invention. At step 510, a user at the slave client computer establishes a communications link between the slave client computer and a Web server. At step 512, the slave client computer receives from the remote host client computer, via the communications link established between the slave client computer and the remote host client computer, an incoming URL corresponding to the selected Web page, along with any required cookie data. At step 514, the shared view engine running on the slave client computer causes a browser running on the slave client computer to transmit the incoming URL to the Web server via a browser running on the slave client computer. In this way, the host client computer and the slave client computers are all browsing the same content.

An important feature of the preferred embodiments of the present invention is the use of a shared view engine that resides on multiple server computers or on multiple client computers to enable the several clients to share the same browsing experience. It is understood, however, that the invention is susceptible to various modifications and alternative embodiments. It should be understood that there is no intention to limit the invention to the specific embodiments described herein. On the contrary, the invention is intended to cover all modifications, alternative constructions, and equivalents falling within the scope and spirit of the claimed invention.

We claim:

1. In a system comprising a server, at least one slave client computer and a host client computer, the host client computer comprising:

a processor;

a memory in communication with the processor;

a browser application resident in the memory, the browser application issuing a request for content on a server, the request comprising a locator corresponding to the content;

a communications interface to a communications network, the communications interface resident in the memory and configured to establish a communications link between the host client computer and the at least one slave client computer on the communications network, wherein the communications link utilizes a tunneling protocol; and a shared view engine resident in the memory for receiving an identification of the at least one slave client computer, intercepting the request issued by the browser application, determining a required cookie data on the host client computer associated with the request, wherein the required cookie data describes state information of the host client computer in relation to the server and does not describe state information of the at least one slave client computer in relation to the server, and providing, via the communications link to the at least one slave client computer, a message comprising the locator and the required cookie data, wherein the shared view engine is configured to selectively direct at least one slave shared view engine resident in the at least one slave client computer to prevent the at least one slave client computer from requesting a Web site from the server.

2. The host client computer of claim 1, wherein the server is a Web server, the content is a Web page, and the locator is a Universal Resource Locator (URL) corresponding to the Web page.

3. The host client computer of claim 1, wherein the communications interface enables the host client computer to establish a plurality of communications links to a plurality of slave client computers on the communications network.

4. The host client computer of claim 1, wherein the communications network is the Internet.

5. The host client computer of claim 1, wherein the communications network is an intranet.

6. The host client computer of claim 1, wherein the communications network is a wide area network.

7. The host client computer of claim 1, wherein the communications network is a local area network.

8. A computer-readable storage medium having stored thereon computer-executable instructions for performing a process comprising:

receiving by a shared view engine on a host client computer an identification of a slave client computer;

establishing a communications link between the host client computer and the slave client computer on a communications network utilizing a tunneling protocol;

issuing by a browser application on the host client computer a request for content from a server;

intercepting by the shared view engine the request;

determining required cookie data associated with the request, wherein the cookie data is associated with a state of the host client in relation to a server and is not associated with a state of the slave client in relation to the server;

sending by the shared view engine to the slave client a message identifying the content and the required cookie data and using the shared view engine to selectively prevent the slave client computer from requesting a Web page.

9. The computer-readable storage medium of claim 8, wherein the server is a Web server and the content is a Web page.

10. The computer-readable storage medium of claim 8, wherein the communications network is the Internet.

11. The computer-readable storage medium of claim 8, wherein the communications network is an intranet.

12. The computer-readable storage medium of claim 8, wherein the communications network is a local area network.

13. The computer-readable storage medium of claim 8, wherein the process further comprises establishing a plurality of communications links to a plurality of slave client computers on the communications network.

14. The computer-readable storage medium of claim 8, wherein the communications network is a wide area network.

15. The computer-readable storage medium of claim 8, wherein the process further comprises issuing by a browser application on the slave client computer a request for the content from the server.

16. A system for generating shared views for browsing a web page, the system comprising:

a host client computer comprising:

a host processor;

a host memory in communication with the host processor;

a host web browser application resident in the host memory, the host web browser application issuing a host request for the web page on a web server, the host request comprising a uniform resource locator corresponding to the web page and cookie data associated with the web page;

a communications interface to a communications network, the communications interface resident in the host memory and configured to establish a communication link between the host client computer and a slave client computer on the communications network, wherein the communication link utilizes a tunneling protocol; and a host shared view engine resident in the host memory for receiving an identification of the slave client computer, intercepting the host request issued by the host web browser application, determining required cookie data on the host client computer associated with the host request, and providing, via the communications link to the slave client, a message comprising the uniform resource locator and the required cookie data associated with the host request with the web page; and the slave client computer comprising a slave processor, a slave memory in communication with the slave processor, and a slave shared view engine resident in the slave memory for receiving the message from the host client computer, upon receiving the message from the host client computer, storing a copy of a current state of a client cookie file on the slave client computer, updating the cookie file on the slave client computer using the required cookie data from the host client computer received in the message, issuing a slave request for the web page, the slave request comprising a uniform resource locator corresponding to the web page and updated cookie data associated with the web page, and upon a receipt of a termination signal, terminating the communication link with the host client computer and restoring the cookie file to an original state using the copy of the client cookie file, wherein the slave shared view engine is configured to prevent the slave client computer from requesting content from the web server unless the host shared view engine directs the slave shared view engine to allow the slave client computer to request the content from the web server.

* * * * *

UNITED STATES PATENT AND TRADEMARK OFFICE
CERTIFICATE OF CORRECTION

PATENT NO. : 7,698,364 B2
APPLICATION NO. : 10/068816
DATED : April 13, 2010
INVENTOR(S) : Felix G. T. I. Andrew et al.

Page 1 of 1

It is certified that error appears in the above-identified patent and that said Letters Patent is hereby corrected as shown below:

In column 10, line 65, in Claim 8, delete "and" and insert -- ; and --, therefor.

Signed and Sealed this
First Day of February, 2011

David J. Kappos
*Director of the United States Patent and Trademark Office*